Oct. 7, 1958 G. A. LYON, JR 2,855,077
WHEEL STRUCTURE
Filed April 10, 1952
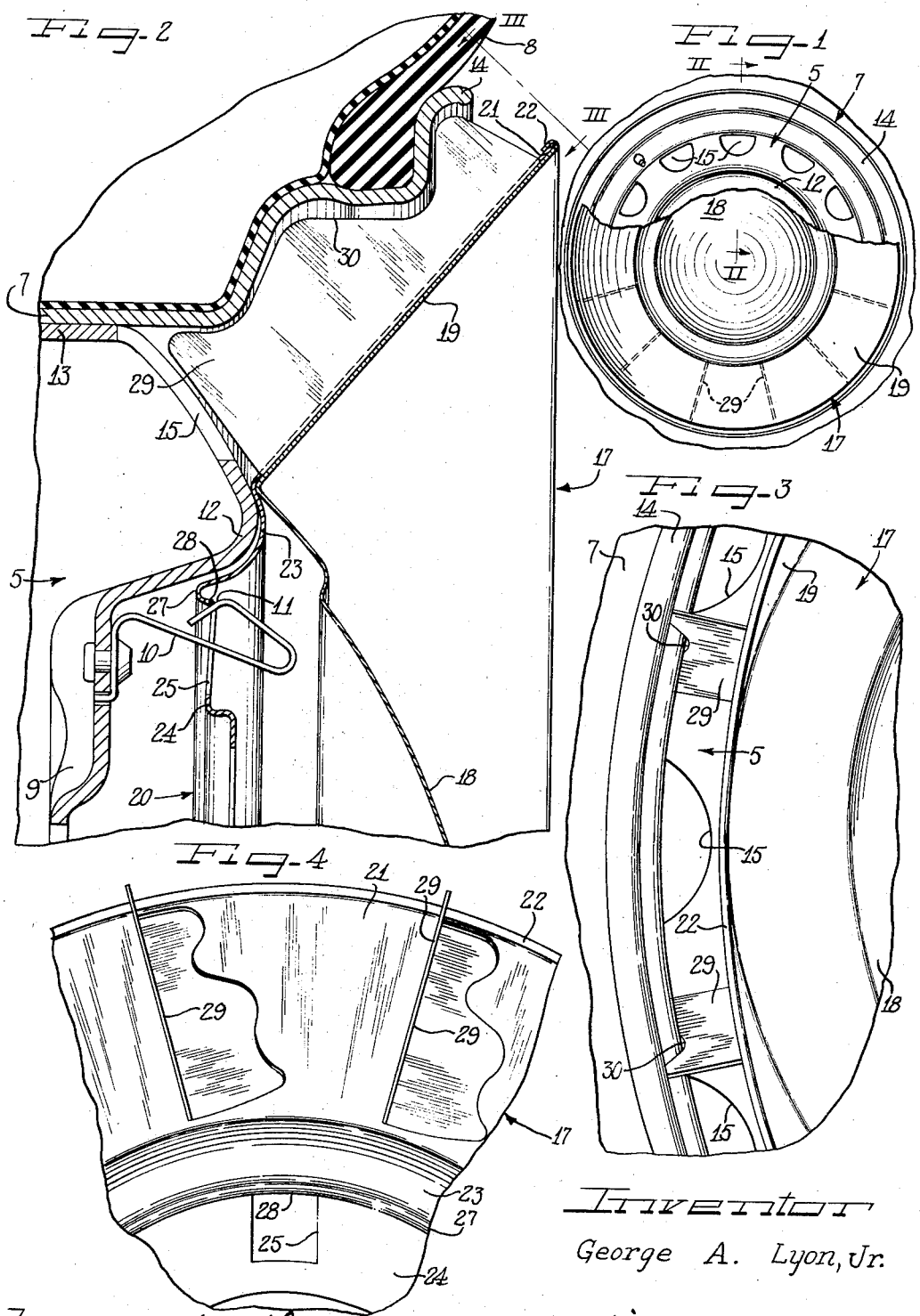
Inventor
George A. Lyon, Jr.
by Hill, Sherman, Meroni, Gross & Simpson Attys

United States Patent Office 2,855,077
Patented Oct. 7, 1958

2,855,077

WHEEL STRUCTURE

George Albert Lyon, Jr., Detroit, Mich.

Application April 10, 1952, Serial No. 281,615

2 Claims. (Cl. 188—264)

The present invention relates to improvements in wheel structures and more particularly to the covering of the outer sides of vehicle wheels in a manner not only to protect and ornament the outer side of the wheel, but also to promote circulation of air through the wheel for cooling the brake drum associated therewith.

An important object of the present inveniton is to provide in a wheel structure of the kind wherein a wheel body has air circulation openings, a cover for the outer side of the wheel having means therebehind and in association with the wheel for promoting circulation of air through the wheel.

Another object of the invention is to provide an improved cover for disposition at the outer side of a vehicle wheel and wherein the cover has air circulation promoting means.

A further object of the invention is to provide an improved vehicle wheel cover having improved means thereon for cooperation with the wheel therebehind to promote air circulation through the wheel.

According to the general features of the invention there is provided in a wheel structure including a wheel body and a tire rim, a cover for the outer side of the wheel comprising a cover body disk and a cover ring member secured to the back of the cover disk and having means engageable with the wheel body for retaining the cover on the wheel, said last mentioned member having a plurality of air circulation promoting vanes struck therefrom and projecting radially toward the tire rim and cooperating therewith to promote circulation of air behind the cover.

According to other features of the invention there is provided in a wheel cover for disposition at the outer side of a vehicle wheel, a cover body member, and a cover retaining ring member secured to the body member and having an outer marginal portion in face to face relation to an outer marginal portion of the body member, said marginal portion of the retaining member having a plurality of generally radially extending air circulation vanes struck therefrom for cooperation with the tire rim of a vehicle wheel for promoting air circulation behind the cover, the openings struck out in the formation of the vanes being closed by said marginal portion of said cover member.

Other objects, features, and advantages of the present invention will be readily apparent from the following detailed description of a preferred embodiment thereof taken in conjunction with the accompanying drawing in which:

Figure 1 is a side elevational view of a wheel structure embodying features of the invention, with the wheel cover partially broken away to reveal details of structure of the wheel therebehind;

Figure 2 is an enlarged radial sectional detail view taken substantially on the line II—II of Figure 1;

Figure 3 is a fragmentary edge elevational view of the wheel and cover taken substantially as looking in the direction of the arrows on line III—III in Figure 2; and Figure 4 is a fragmentary rear elevational view of the cover.

As shown on the drawings:

A wheel with which the present invention is adapted to be employed includes a wheel body 5 and a tire rim 7 adapted to support a pneumatic tire and tube assembly 8. The wheel body 5 may comprise a stamped sheet metal disk of suitable heavy gauge including a central bolt-on flange 9 by which the wheel is adapted to be attached to the brake drum on a vehicle axle. The flange 9 carries a series of cover-retaining spring clips 10 of the gooseneck type including respective resilient shouldered terminal flanges 11 directed generally toward an intermediate annular nose bulge 12 on the wheel body.

At its radially outer margin the wheel body 5 is provided with an attachment flange 13 by which the wheel body is secured to the base flange of the tire rim 7. By preference, the tire rim 7 is of the multi-flanged drop center type having a more or less stepped flange structure terminating in a terminal flange 14.

The wheel body 5 is provided at preferably uniformly spaced intervals adjacent its outer margin with ventilation openings 15. It is desirable in the operation of the vehicle with which the wheel is associated that air circulate through the openings 15 for cooling the brake drum associated with the wheel. On the other hand, it is desirable to cover the outer side of the wheel protectively and ornamentally.

According to the present invention, not only is the outer side of the wheel covered, but circulation of brake drum cooling air is promoted through the wheel and more especially the wheel openings 15. To this end, there is provided a wheel cover 17 which is of what is known as the full disk type of cover, that is, it is devised to substantially cover the outer side of the wheel when mounted thereon. Nevertheless, the cover 17 is constructed to promote air circulation through the wheel openings 15. In a preferred form, the cover 17 comprises a body disk member 18 which may be stamped from appropriate gauge thin sheet metal which may be stainless steel or other appropriate metal that is adapted to receive a satisfactory external finish such as a burnished or polished finish or may be plated or otherwise attractively finished. The central portion of the body member 18 may be of any desired configuration such as crowned and outwardly protruding as shown. The central crown portion is preferably of a diameter to extend to the radially outer side of the peak of the nose portion 12 of the wheel body. From this point, the cover member 18 extends generally radially and axially outwardly and preferably frustoconically to provide a fairly wide marginal portion 19.

The body portion 18 is carried by a supporting and attachment member 20. For this purpose, the member 20 has an outer marginal portion 21 which is complementary to the marginal portion 19 and is secured in face to face relation thereto at the inner side of the portion 19 and is fastened in place by means such as an underturned marginal finishing and retaining flange 22 at the radially outer extremity of the cover portion 19.

Extending generally radially inwardly from the inner edge of the portion 21 of the inner member is a seating portion 23 which is preferably annular and dished or concavely bowed so as to clear the wheel cover nose bulge 12 except at the radially outer side where the portion 23 seats against the wheel body. Extending radially inwardly from the wheel nose clearance rib or channel portion 23 is an attachment flange 24 having therein, at appropriate intervals corresponding to the intervals at which the retaining clips 10 are mounted, respective clip apertures 25 through which the heads of the retaining clips 10 are received when the cover is mounted on the wheel. The attachment flange 24 is spaced from the bolt-on flange 9 of the wheel body sufficiently to enable snap-on pry-off retaining engagement of the attachment flange 24 by the clip shoulder flanges 11 at the radially outer sides of the respective clip apertures 25. For stiffness to withstand the retaining force of the clips and also to avoid damaging the flange 24 when the cover is pried from the wheel or when the same is applied, the portion of the flange 24 radially outwardly from the apertures 25 is preferably reinforced as by providing the same with an annular generally axially inwardly projecting reinforcing rib 27 having at the radially inner side thereof where the rib joins the clip apertures 25 a clip engageable shoulder 28 of substantial rigidity. It will also be observed that the radially inner side of the rib 27 affords a cam surface engageable cammingly with the heads of the retaining clips in pressing the cover home on the wheel. Thus, the composite cover is adapted to be mounted on the wheel by centering the same with respect to the wheel body and with the clips 10 projecting through the clip apertures 25 and then pressing the cover axially inwardly until the clip shoulders 11 snap over the flange shoulder 28, whereupon the clips snugly hold the cover onto the wheel and more especially against the nose bulge 12 of the wheel body.

For promoting air circulation behind the cover and more especially through the wheel openings 15, the multi-layer reinforced marginal structure 21 of the cover is spaced radially inwardly and axially outwardly from the tire rim 7 so as to afford a substantial space through which air can circulate. Moreover, the outer edge of the cover extends substantially axially outwardly opposite the terminal flange 14 of the tire rim so that, in the operation of the vehicle and the forward movement of the wheels therewith, air is scooped in by the outer marginal portion of the cover to travel toward and through the wheel openings 15 into cooling relation to a brake drum (not shown) associated with the wheel.

In order to assure that the air entering behind the cover will efficiently move on through the respective wheel openings 15, a series of air circulation promoting vanes 29 is provided at the back of the cover in cooperation with the tire rim. To this end, the marginal portion 21 of the retaining ring of the cover assembly is struck out at appropriate intervals to provide the vanes 29 which are bent from the portion 21 in a generally radial direction and preferably in planes radial to the center of the cover. The vanes 29 are of a width to extend from adjacent to the opposite edges of the portion 21 and are of a length to project substantially throughout the intervening space between the portion 21 and the opposing face of the tire rim. By preference, each of the vanes 29 has an edge 30 which is conformed generally complementary to the multi-flange shape of the tire rim so as to approach the tire rim closely but not necessarily into contact therewith, although if desired direct contact may be had.

By preference, the vanes 29 are in such number and are so spaced that one of the vanes comes between each adjacent pair of the openings 15 whereby to provide partitions separating the space between the cover and the tire rim into compartments respectively associated with the openings 15. That is, there are as many compartments as there are openings 15 and the relationship will be substantially as seen in Figure 3. Hence, air entering from the outer edge of the cover is substantially funneled toward the respective wheel opening associated with the compartment provided therefor. The mouths of the compartments, it will be noted from Figure 2, open from the gap between the outer edge of the cover and the tire and terminal flange 14. Since the vanes or partitions 29 are radially disposed with regard to the center of the cover, their inner ends are closer together than their outer ends, and therefore the air which, in the forward movement of the wheel in service, is scooped into the compartments between the vanes, is compressed as it moves radially and axially inwardly and is therefore accelerated in movement on the nature of a venturi as it issues through the respective wheel openings 15 into cooling relation to the associated brake drum.

The outer cover member marginal portion 19 closes the openings from which the vanes 29 have been struck in the cover portion 21 and thereby provides a solid closure at the axially outer side of the air space so that there is no diversion of air through the openings, but all of the air is directed toward the respective wheel openings 15.

By reason of the uniform straight radial planes in which the vanes or partitions 29 are placed, it will be clear that the cover can be used interchangeably at the left or right side of a vehicle.

It will be understood that modifications and variations may be effected without departing from the scope of the novel concepts of the present invention.

I claim as my invention:

1. In a composite cover assembly for disposition at the outer side of a vehicle wheel, an outer cover member and an inner cover member, said cover members having intermediate complementary and internested inwardly directed annular ribs and generally radially and axially outwardly extending marginal portions at the radially outer sides of the ribs, with the marginal portion of the inner cover member substantially concealed by the outer marginal portion of the outer cover member, said marginal portion of the inner cover member having a series of air circulation promoting vanes projecting inwardly therefrom and provided with respective edges that are generally complementary to flange structure of the wheel for close assembled relationship therewith, and means on said inner cover member spaced from said vanes for attachment of the cover to a wheel.

2. In a composite cover assembly for disposition at the outer side of a vehicle wheel, an outer cover member and an inner cover member, said cover members having intermediate complementary inter-nested inwardly directed annular ribs and generally radially and axially outwardly extending marginal portions at the radially outer sides of the ribs with the marginal portion of the inner cover member substantially concealed by the outer marginal portion of the outer cover member, said marginal portion of the inner cover member having a series of air circulation promoting vanes projecting inwardly therefrom and provided with respective edges that are generally complementary to flange structure of the wheel for close assembled relationship therewith, and means on the cover for attachment of the cover to a wheel.

References Cited in the file of this patent

UNITED STATES PATENTS

| | | |
|---|---|---|
| 2,265,938 | Eksergian | Dec. 9, 1941 |
| 2,433,854 | Lyon | Jan. 6, 1948 |
| 2,441,008 | Chase | May 4, 1948 |
| 2,600,410 | Lyon | June 17, 1952 |
| 2,633,944 | Butterfield | Apr. 7, 1953 |

FOREIGN PATENTS

| | | |
|---|---|---|
| 682,948 | France | Feb. 24, 1930 |

OTHER REFERENCES

Chrysler, page 14, vol. 21, No. 5, "Brake Service," May 1951.